July 17, 1923.
F. B. PFEIFFER
TIRE CONSTRUCTION
Filed Oct. 17, 1921
1,461,984
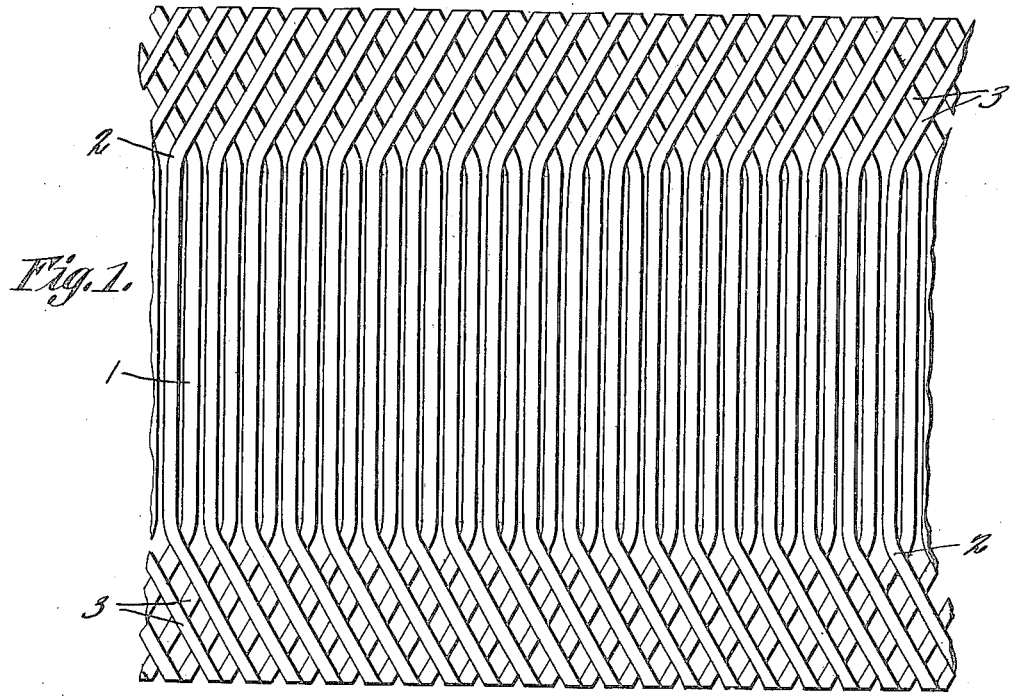
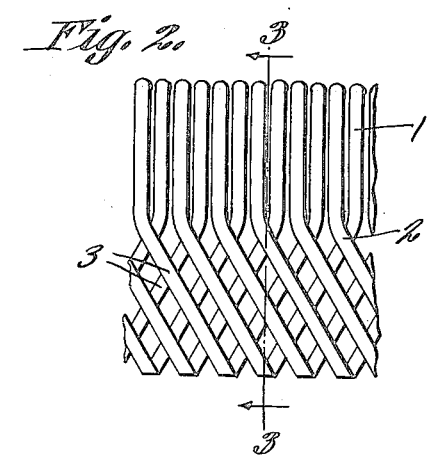
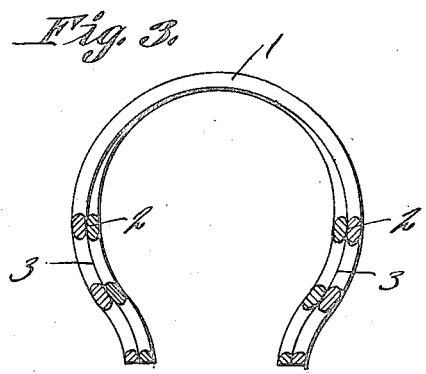
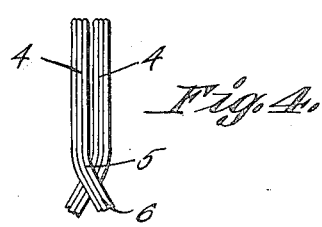
F. B. Pfeiffer, Inventor.
Attorneys.

Patented July 17, 1923.

1,461,984

UNITED STATES PATENT OFFICE.

FRED BROWN PFEIFFER, OF AKRON, OHIO.

TIRE CONSTRUCTION.

Application filed October 17, 1921. Serial No. 508,233.

*To all whom it may concern:*

Be it known that I, FRED B. PFEIFFER, a citizen of the United States, residing at Akron, in the county of Summit and State of Ohio, have invented a new and useful Tire Construction, of which the following is a specification.

The device forming the subject matter of this application is a pneumatic tire carcass or casing, and the invention aims so to locate a plurality of cords in the casing that the casing will have a yieldable tread and relatively rigid side portions.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a portion of a casing constructed in accordance with the invention, the same being laid out flat; Figure 2 is a side elevation wherein the parts are in the positions which they will assume in the casing; Figure 3 is a cross section on the line 3—3 of Figure 2; and Figure 4 is a fragmental side elevation showing a modification.

The casing forming the subject matter of this application embodies a plurality of cords the body portions of which are extended in approximately parallel relation, as indicated at 1, across the tread of the casing, in planes at an angle to the axis of the casing, and, preferably, in planes at right angles to the axis of the casing, the ends of adjacent cords being crossed on each other as at 2, and being inclined, with respect to the body portions in opposite directions, circumferentially of the casing, as shown at 3. In referring above to the "axis" of the casing, I mean a circumferential longitudinal line passing through the center of any cross section of the casing, and not the axis on which the wheel carrying the casing revolves when the wheel rolls with the casing in contact with the ground.

If desired, the cords may be disposed in groups, as shown at 4 in Figure 4, the cords of the groups being crossed upon each other as at 5, and being inclined in opposite directions, circumferentially of the casing, as shown at 6.

The construction of the device is such that the casing will have a yieldable tread portion and relatively rigid side portions. The construction gives the cords an anchorage on the base portion of the tire, so that, as the torque is applied to the tire, alternate cords or groups of cords are under tension throughout their entire length, from bead to bead, the result being an even distribution of the torque on both beads, equally, by the same cord. In the ordinary and common construction, the cords of a tire run diagonally across the carcass, and, as a consequence, each cord is under tension from the bead portion to the central tread portion, and under compression from the central tread portion to the opposite bead, one layer of cords taking the torque on one bead, and the next layer taking the torque to the opposite bead, thereby causing a pulling or sawing action between the alternate layers of cords. The plies are separated as a consequence. In the device forming the subject matter of this application, the foregoing undesirable results do not obtain. Further, in the device forming the subject matter of this application, the cords are so interengaged that the cords which are inclined in one direction, circumferentially of the casing, tend to keep in place, the cords which are inclined circumferentially of the casing in an opposite direction.

Having thus described the invention, what is claimed is:

1. A tire casing embodying cords the body portions of which are extended in approximately parallel relation across the tread of the casing, the ends of adjacent cords being crossed upon each other and being inclined, with respect to the body portions, in opposite directions circumferentially of the casing.

2. A tire casing embodying cords the body portions of which are extended in approximately parallel relation across the tread of the casing in planes at an angle to the axis of the casing, the ends of adjacent cords being crossed upon each other and being inclined, with respect to the body portions, in opposite directions circumferentially of the casing.

3. A tire casing embodying cords the body portions of which are extended in approximately parallel relation across the tread of the casing in planes in right angles to the axis of the casing, the ends of adjacent cords being crossed upon each other and being inclined, with respect to the body portions in opposite directions circumferentially of the casing, those ends which are inclined in one direction being parallel to each other, and those ends which are inclined in an opposite direction being parallel to each other.

In testimony that I claim the foregoing as my own, I have hereto affixed my signature in the presence of two witnesses.

FRED BROWN PFEIFFER.

Witnesses:
  H. H. WESENER,
  L. G. MISHLER.